UNITED STATES PATENT OFFICE.

CHARLES E. PELLEW, OF NEW YORK, N. Y.

STENCILING-INK.

No. 911,327.  Specification of Letters Patent.  Patented Feb. 2, 1909.

Application filed November 25, 1908. Serial No. 464,393.

*To all whom it may concern:*

Be it known that I, CHARLES E. PELLEW, a citizen of the United States, and a resident of New York city, county, and State, have invented a new and improved stenciling-ink having a marked capacity for being rendered extremely permanent when applied to the material to be stenciled.

In composing my ink, I preferably use; 1st, a suitable amount (say 1%) of some basic color which may be a coal-tar color such as methylene blue; 2nd, enough volatile organic acid such as acetic acid (say 5 to 10%) to adequately hold said basic color in solution; 3d, about 5% of a suitable fixing agent such as tannin; 4th, a little tartaric acid (say $\frac{1}{2}$%); and 5th, the balance made up of sufficient water and gummy material, such as gum tragacanth, to render the whole somewhat "tacky".

Viewed in the light of current knowledge, this disclosure will suggest further modifications to meet varied conditions, hence further elaboration is unnecessary.

I therefore claim:

1. A stenciling ink containing a small amount of a basic color, enough volatile organic acid to dissolve said basic color, some tannin, and sufficient gummy matter to render the whole syrupy.

2. A stenciling ink containing a small amount of a basic coal-tar color, enough acetic acid to dissolve said basic color, about 5% of tannin, and gummy matter to render the ink syrupy.

3. A stenciling ink containing about 1% of a basic anilin color, about 5 to 10% of acetic acid, about 5% of tannin, about a half-per cent. of tartaric acid, and enough gummy matter to make the ink syrupy.

CHARLES E. PELLEW.

Witnesses:
  FREDERIC W. ERB,
  H. HARLOW STRUTHERS.